(12) United States Patent
Platz et al.

(10) Patent No.: US 6,497,782 B1
(45) Date of Patent: Dec. 24, 2002

(54) COMPOSITE ARTICLE FROM ENGINEERING THERMOPLASTICS AND POLYURETHANE ELASTOMERS, USING AN ADHESION PROMOTER

(75) Inventors: Di Reinhold Platz, Mühltal (DE); Detlef Danilow, Much (DE); Alfred Link, Bergheim (DE); Norbert Krämer, Dormagen (DE); Klaus Langerbeins, Pulheim (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/465,557

(22) Filed: Dec. 17, 1999

(30) Foreign Application Priority Data

Dec. 17, 1998 (DE) .......................... 198 58 270

(51) Int. Cl.⁷ .............................. B29C 47/00
(52) U.S. Cl. ................... 156/245; 264/129; 264/265
(58) Field of Search ................ 264/265, 129; 156/245

(56) References Cited

U.S. PATENT DOCUMENTS 3,959,554 A * 5/1976 Hick ................. 428/424.4
4,443,519 A     4/1984 Donermeyer et al.
4,666,758 A * 5/1987 Hunter et al. ........... 156/245
5,120,415 A     6/1992 Yuan

FOREIGN PATENT DOCUMENTS

DE        31 26 842       1/1983
FR        2 443 488       8/1980

* cited by examiner

*Primary Examiner*—John J. Gallagher
(74) *Attorney, Agent, or Firm*—Connolly Bove Lodge & Hutz LLP

(57) ABSTRACT

A process for producing a composite article from at least one polar thermoplastic, in particular an engineering thermoplastic, and from at least one foamed or unfoamed polyurethane elastomer, where a molding is firstly molded from the thermoplastic, and some or all of this is provided with an adhesion promoter based on acrylic-resin lacquer or polyurethane-resin lacquer comprising solvents, and then a coating which may be in full-surface or strip form or at least one other molding made from the polyurethane elastomer is used for overmolding, and the thermoplastic material is thus bonded to the polyurethane material.

7 Claims, No Drawings

COMPOSITE ARTICLE FROM ENGINEERING THERMOPLASTICS AND POLYURETHANE ELASTOMERS, USING AN ADHESION PROMOTER

The invention relates to a process for producing a composite article from polar thermoplastics and polyurethane elastomers, in which the thermo-plastic material is treated with an adhesion promoter comprising solvents, and also to the composite articles which can be produced and are produced thereby. Use of the adhesion promoter makes it possible to obtain adhesion of polyurethane elastomers on plastics which do not exhibit any adhesion without use of the adhesion promoter.

The polar thermoplastics include in particular those known as engineering thermoplastics, also known as high-performance polymers. These have excellent thermal, mechanical and chemical properties and are therefore preferred materials for engineering applications. Moldings produced from these have good strength and hardness, together with excellent resilience, and are therefore applied widely and very frequently in all areas of daily life, for example in the construction of motor vehicles and other equipment, and for housings and casings, keyboards and snap connectors. Their excellent sliding-friction properties also make them useful for many moving parts, such as power train components, deflector rolls, gear wheels and shift levers.

However, moldings of this type frequently have a low mechanical damping factor, which in certain applications requires the use of soft damping elements. In addition, it is often necessary to use a seal at junctions when moldings are installed. The high surface hardness of the moldings can, under certain circumstances combined with a low sliding-friction coefficient, cause items placed thereon to slip, and this can compromise, for example, the operating reliability of switching units and control units. For these reasons, combinations of hard and soft materials are used more and more frequently in order to combine the particular properties of these materials with one another. The hard material here is intended to give the component or molding its strength, and the elastic properties of the soft material permit it to take on the functions of sealing, or of damping vibration or deadening sound, or of altering surface feel. In these applications it is important that there is adequate adhesion between the hard and the soft component.

Gaskets, damping elements, etc. are frequently provided separately, made from a soft material, and usually anchored mechanically to a thermoplastic molding or adhesive-bonded thereto in an additional operation, creating more work and in some cases considerable cost.

A newer and more cost-effective method is multicomponent injection molding, in which, for example, a second component is used for overmolding on a first, ready-molded, component. The adhesion between the two components here should be very strong, but may frequently be further improved in physical interlocks, by applying undercuts, for example. Good basic adhesion between the two components, for example as a result of chemical affinity, is generally a precondition for their practical application and is therefore of great importance for this process.

Examples which are well known are multicomponent-injection-molded combinations of polypropylene with polyolefin elastomers or with styrene-olefin elastomers, or of polybutylene terephthalate with polyester elastomers or with styrene-olefin elastomers. Polyamides, too, adhere to very many soft components.

There are also known moldings made from polyacetal with directly molded-on functional elements, produced using uncrosslinked rubbers (DE-C 44 39 766). The bond strength of composite articles of this type is, however, still unsatisfactory.

DE-A9611272 describes just such composite articles, composed, inter alia, of a polyacetal, a rubber copolymer, a reinforcing filler, a crosslinking agent and, if desired, other conventional additives. Particularly good adhesion of the polymer components is achieved here by vulcanizing the rubber fraction. However, the elevated temperatures and long times needed for vulcanization make this additional step disadvantageous.

Another application (German patent application No. 197 43 134.8) relates to a process for producing composite articles from polyacetal and a soft component, by preinjecting the polyacetal in a mold in a first step and, in a second step, using the lower-hardness material for overmolding, thereby bonding this to the polyacetal. For the lower-hardness region here, use is made of a thermoplastic polyurethane elastomer (TPE-U) with a hardness of from Shore A 65 to Shore D 75. However, this range of hardness is too high for many applications. In addition, the thermoplastic polyurethane elastomers described have the known disadvantages in processing, e.g. moisture absorption, the resultant thermal instability and variable flowability and also mold-release problems.

It is clear that softer damping elements could be obtained using foamed elastomers, which generally have a lower hardness than the corresponding compact elastomers. In processes which have become established in recent years, therefore, soft elastomer foam gaskets are applied, in a second operation, to the hard material which has been removed from an injection mold. Single-component or two-component polyurethanes are particularly suitable for this purpose. Addition-crosslinking two-component polyurethanes are particularly advantageous for achieving high production rates, as a result of relatively rapid and thorough curing without the need for prolonged drying times. However, the different chemical nature of these substances and the different processing conditions for the hard and soft component frequently give rise to adhesion problems in such cases.

The method generally used for improving adhesion to thermoplastics is to flame-treat the surface of the plastic, or to treat it with some other oxidative process, e.g. corona treatment or plasma treatment.

It is also well known that an adhesion promoter can be used to bring about adhesion between materials which do not per se adhere to one another. The makeup of the adhesion promoter here must be such that it has high chemical affinity for both of the materials to be bonded to one another, but does not subject these materials to chemical attack.

Whereas solutions have been found for a wide variety of cases, for example the adhesion of a plastic to metal, glass or other materials, there is a difficulty with particular engineering thermoplastics in achieving sufficiently strong and durable adhesion to polyurethane elastomers. However, it is precisely these engineering thermoplastics which are of interest for many applications, for example in automotive construction, where a molding, component or functional part produced from these thermoplastics is to be provided with a gasket. Polyurethane elastomers are again particularly suitable for gaskets of this type.

The object was therefore to provide a process which avoids the disadvantages and limitations mentioned and produces a composite article made from engineering thermoplastics and polyurethane elastomers.

Surprisingly, it has now been found that the use, as an adhesion promoter, of clear lacquers or primers which have been designed for use on metal surfaces gives an adhesive bond between polyurethane elastomers and engineering thermoplastics or other polar thermoplastics. Suitable adhesion-promoter systems involve acrylic-resin lacquers and polyurethane-resin lacquers which comprise solvents and which may have been modified by adding fillers, pigments or a crosslinking component.

By using these adhesion-promoter systems according to the invention, sealing or damping elements, for example, made from polyurethane elastomers can be laid down with adhesive bonding directly onto moldings made from polar thermoplastics, or be molded onto these, without any need for undercuts or other assembly steps. Without using these adhesion-promoter systems it is not possible to produce a bond between the polyurethane elastomer and, in particular, polyacetal or a polyester. Even widely used techniques, such as surface-etching, plasma treatment (corona discharge) or flame-treatment of the surface of the thermoplastic molding, do not give the desired result.

The invention therefore provides a process for producing a composite article from at least one polar thermoplastic and at least one foamed or unfoamed polyurethane elastomer, where a molding is firstly molded from the polar thermoplastic, and some or all of this is provided with an adhesion-promoter system based on acrylic-resin lacquer or polyurethane-resin lacquer comprising solvents, and then a coating which may be in full-surface or strip form or at least one other molding made from the polyurethane elastomer is used for overmolding, and the thermoplastic material is thus bonded to the polyurethane material via the adhesion promoter.

The invention also provides, in particular, the composite articles which can be produced by the novel process.

The novel composite article here is formed by a thermoplastic molding, some or all of which has been coated with a polyurethane elastomer, or onto which one or more moldings, also called functional parts, made from a polyurethane elastomer have been directly molded on. This may be, for example, a sheet-like molding, one side of which carries a layer made from polyurethane elastomer, or a molding of any desired shape on which the polyurethane elastomer has been laid down in the form of strips, sometimes called beads.

Examples of novel composite articles are generally functional parts or moldings provided with gaskets, damping elements, retaining elements and other functional elements etc. The functional parts and moldings obtain the required dimensional stability from the thermoplastic material and the desired frictional properties, sealing function, acoustic properties, feel and appearance from the elastomer coating. They include, for example, housings and closure systems, and also bodywork parts and motor vehicle parts in the widest sense.

The composite article may, however, also be composed of one or more thermoplastic moldings of any desired shape, onto which have been directly molded one or moldings of any desired shape made from the polyurethane elastomer. The expression "directly molded on" means, for the purposes of the present invention, that the functional elements have been directly overmolded onto the molding with which they are intended to enter into a strong adhesive bond, in particular by multicomponent injection molding.

In every case, the adhesion between the thermoplastic material and the polyurethane elastomer is brought about by the adhesion-promoter system according to the invention, which is applied to the thermoplastic molding before the polyurethane elastomer is used for overmolding.

The adhesion-promoter system according to the invention is generally an acrylic-resin lacquer polyurethane-resin lacquer comprising solvents. If desired, the lacquer may have been modified using fillers, such as talc, heavy spar or zinc oxide, or also using pigments, in particular functional pigments, enabling, for example, low coefficients of thermal expansion and good adhesion to polar and nonpolar surfaces to be established. The solids content in the lacquer is usually more than 40% by weight, frequently even more than 50 or 60% by weight, and is matched to the desired conditions for bonding and processing.

The solvents present in the adhesion-promoter system are essentially organic, i.e. aliphatic and/or aromatic solvents, and it may be advantageous here to use mixtures of different solvents. Examples of suitable solvents are butyl acetate, xylene, ethylbenzene and benzyl alcohol, and also mixtures of these. The solvent firstly gives the lacquer its workability, for example for painting or spraying, and also slightly softens the contact surface to allow deep penetration of the functional constituents of the adhesion-promoter system into the microstructure of the hard thermoplastic substrate.

According to the invention it is preferable to use a lacquer with urethane-crosslinking acrylic resin. This lacquer may be used on its own or together with a crosslinking component which crosslinks hydroxyl or amino functions present in the acrylic resin. The crosslinking component added may, for example, be a bi-, tri- or multifunctional isocyanate. The amount of crosslinking agent to be used here depends on the amount and functionality of the acrylic-resin components to be crosslinked, and also on the desired degree of crosslinking.

The particular feature of the adhesion-promoter system to be used according to the invention is that it can generally be used on polar and nonpolar surfaces, i.e. in particular on many thermoplastics having polar groups. The adhesion-promoter system can be matched to particular hard/soft components (hard=thermoplastic, soft=elastomer) by varying the nature and amount of fillers, pigments, solvents and crosslinking agents. The adhesion-promoter system adheres well to polyurethane, since chemical similarity and polar groups predominate. A further advantage is that after drying, i.e. after evaporation of the solvent, a matt surface remains on the adhesion promoter applied, and this surface additionally brings about mechanical anchoring of the polyurethane elastomer.

The composite article is produced by well known methods and processes. A cost-effective and advantageous process is one in which the thermoplastic molding is first produced, for example by injection molding, followed by coating with the adhesion promoter, and the polyurethane elastomer is then laid down as a bead or in full-surface form, or molded on in the form of a molding. It is possible here to lay down the polyurethane elastomer on the surface treated with the adhesion promoter before this has completely finished reacting and/or has dried. The adhesion promoter may advantageously be applied by spraying, as is usual in the paint industry. The soft polyurethane material used is advantageously in the form of two components and may, in particular if it is to be laid down in the form of a bead, advantageously be applied using mixing and metering machinery for low output rates (from about 0.1 to 100 g/sec).

The tensile bond strength achieved by the novel process between the thermoplastic molding and the polyurethane elastomer generally depends on whether the polyurethane elastomer used is in foamed or unfoamed form. For unfoamed polyurethane elastomer, a desirable bond strength for many applications is at least 0.3 N/mm$^2$, and for foamed polyurethane elastomer a bond strength of from 0.1 to 1.0 N/mm² is achievable. Higher tensile stresses are likely to lead to tearing of the elastomer. For functional parts—depending on the loading—relatively high adhesion is desired.

For the purposes of the present invention, adhesion between the polar thermoplastic, in particular the engineering thermoplastic, and the polyurethane elastomer is present if it is predominantly cohesive fracture which occurs when these two constituents of a composite article are pulled apart, i.e. if during this the constituents of one component remain adhesive-bonded to the other. If the polyurethane elastomer can be pulled away from the thermoplastic without residues of the elastomer remaining on the thermoplastic, or, conversely, residues of the thermoplastic remaining on the elastomer, the fracture is adhesive and the adhesion is inadequate.

The polar thermoplastics according to the invention generally include polymers with polar functional groups in the main chain, e.g. in the structural building blocks of the chain, or in substituents, but include in particular those known as engineering thermoplastics. Among the engineering thermoplastics, for many applications particular preference is given to high-performance polymers which have a melting point above 100° C., in particular above 200° C. High-performance polymers are described, for example, in Ullmann's Encyclopedia of Industrial Chemistry, 5th edition, VCH Verlagsgesellschaft mbH, Weinheim-New York 1992, and in G. W. Becker, D. Braun: Kunststoffhandbuch Vol. 3/3, Carl Hanser Verlag, Munich 1994, which are incorporated herein by way of reference.

According to the invention, the engineering thermoplastics include particularly polyacetals, polyesters, polyarylene sulfides, polycarbonates, polyphthalamides, polyetherimides, polyether ether ketones, syndiotactic polystyrene (SPS), cycloolefin copolymers and liquid-crystalline polymers (LCPs). The thermoplastics may be used individually or as a mixture, or also as a blend with one or more other plastics which are thermoplastic, thermosetting or elastomeric. In particular, the thermoplastics may also comprise other polymeric additives, for example in order to modify their chemical or mechanical properties for a particular application, or in order to improve their adhesion properties.

As well as freshly produced products, the engineering plastics produced may also be recycled materials of the 1st, 2nd or higher generations, or also mixtures of freshly produced products and recycled materials, which may, if desired, comprise additives and/or have been modified by admixing other compatible polymers.

Polyacetals are well known and are described, for example, in DE-A 29 47 490.They are generally what are known as polyoxymethylenes (POMs), which generally contain at least 80 mol%, preferably at least 90 mol%, of oxymethylene units (—CH₂O—). For the present invention, polyoxymethylenes are either homopolymers of formaldehyde or of its cyclic oligomers, such as trioxane or tetroxane, or else appropriate copolymers made from formaldehyde or from its cyclic oligomers, in particular trioxane, and from cyclic ethers, cyclic acetals and/or linear polyacetals.

The polyacetals used generally have a melt index (MFR 190/2.16) of from 0.5 to 75 g/10 min (ISO 1133). It is also possible to use modified grades of POM, such as blends made from POM with TPE-U (thermoplastic polyurethane elastomer) or with MBS (methyl methacrylate-butadiene-styrene core-shell elastomer), or with methyl methacrylate-acrylate core-shell elastomer, or with PC (polycarbonate), or with SAN (styrene-acrylonitrile copolymer) or with ASA (acrylate-styrene-acrylonitrile copolymer composition).

Polyesters preferably contain polymerized units which derive from an ester of at least one aromatic dicarboxylic acid, in particular terephthalic acid, isophthalic acid or 2,6-naphthalenedicarboxylic acid, and of at least one linear aliphatic dialcohol, in particular ethylene glycol, 1,3-propanediol or 1,4-butanediol, or contain polymerized units which derive from tetrahydrofuran. Polyesters of this type are described, for example, in "Ullmann's Encyclopedia of Industrial Chemistry", ed. Barbara Elvers, Vol. A21, chapter on polyesters (pp. 227–251), VCH, Weinheim-Basel-Cambridge-N.Y., 1992.The polyesters may be either homopolym or else copolymers of these building blocks. Particular preference is given to polybutylene terephthalate and polyethylene terephthalate, and also to poly(butylene terephthalate-co-butylene isophthalate).

The polyester raw materials may also have been modified to incorporate by condensation small proportions of aliphatic dicarboxylic acids, e.g. glutaric acid, adipic acid or sebacic acid, or of polyglycols, such as diethylene glycol, triethylene glycol or else higher-molecular-weight polyethylene glycols, or may also contain polymerized units which derive from hydroxycarboxylic acids, preferably hydroxybenzoic acid or hydroxy-naphthalenecarboxylic acid.

Polyarylene sulfides are also known, inter alia, as polyarylene thioethers. These include heat-resistant polymers built up from arylene sulfide groups. The arylene units here are based on mono- or polynuclear aromatic compounds. Examples of these are phenylene, biphenylene, naphthalene, anthracene and phenanthrene, with single or multiple substitution if desired. Preferred polyarylene sulfides are polyphenylene sulfides, known, for example, by the trade names ®Fortron and ®Ryton.

Polycarbonates are described, for example, in "Encyclopedia of Polymer Science and Engineering", John Wiley & Sons, New York 1988, Vol. 11, pp. 648–718, which is incorporated herein by way of reference. Polycarbonates are supplied, for example, with the name ®Makrolon (Bayer AG).

Cycloolefin copolymers are described by H. Cherdron, M. Brekner and F. Osan in Die Angewandte Makromolekulare Chemie (223), 121, 1994, which is incorporated herein by way of reference. Cycloolefin copolymers are supplied, for example, with the name ®Topas (Ticona GmbH).

Polyether ether ketones (PEEK) are available commercially from Victrex Deutschland GmbH, liquid-crystalline polyesters are, for example, available with the name ®Vectra (Ticona GmbH), and polyetherimides are available with the name ®Ultem (General Electric).

According to the invention it is possible to use either single-component or else two-component polyurethane elastomers. It is particularly advantageous to use an addition-crosslinking, two-component flexible polyurethane foam system. The polyurethane elastomer used according to the invention is composed of polyhydric short-, medium- or long-chained alcohols (polyols) built up on a polyester basis or on a propylene oxide-ethylene oxide copolymer (ether polyol) basis, with hydroxyl end groups crosslinked using multifunctional isocyanates.

The A component of a two-component flexible foam system comprises, besides the polyols mentioned, water, catalysts and other additives conventional in polyurethane processing. It may also comprise conventional stabilizers, processing aids or additional coupling agents, for example on the basis of modified silanes, or also from 0 to 70% by weight of inorganic fillers.

The B component of a system of this type is composed predominantly of bifunctional and higher-functional isocyanates. These are usually aromatic isocyanates, such as diphenylmethane diisocyanate (MDI) or tolylene diisocyanate (TDI), or aliphatic isocyanates. By varying the makeup, and also the mixing ratio, of the A and B components it is possible to produce modified, foamed or unfoamed, polyurethane elastomers with a variety of properties. The term polyurethane elastomers here does not include what are known as thermoplastic polyurethane elastomers (TPE-Us).

Either the thermoplastic material or the polyurethane elastomer may generally also comprise conventional additives. Examples which should be mentioned here are stabilizers, nucleating agents, mold-release agents, lubricants, fillers, reinforcing materials, pigments, carbon black, light stabilizers, flame retardants, antistats, plasticizers and optical brighteners. The additives may be present in amounts which are general and usual.

Besides the application sectors mentioned at the outset, the novel composite articles are used as connecting elements in the form of fittings, couplings, rollers, bearings, functional parts with integrated sealing and/or damping properties, and also as elements which are non-slip and easy-grip. These include, in particular, housings used in automotive construction, such as door closure housings, window lifter housings, sliding-roof sealing elements and the like, and also central-locking units, internal and external trim, mudguards, bumpers, etc., and also fuse boxes and electrical distribution systems, power train housings, engine housings, housings for separating wet and dry spaces, and moreover fastening elements with an integrated seal, such as clips with sealing rings or sealing washers, decorative strips with an integrated sealing lip, sealing elements for compensation in expansion joints, fastening elements with good damping properties, e.g. clips with centers for damping vibration or noise, power train components, such as gear wheels with damping elements, gearboxes with integrated flexible couplings, non-slip, easy-grip elements, such has control levers or control knobs, or grip surfaces on electrical devices, on tools or on writing implements, etc., and also chain links with a resilient surface.

The examples below are intended to explain the invention in greater detail to the skilled worker, without limiting its scope.

The adhesion-promoter systems used in the examples below are:

Percotex-Strukturlack 449 RAL 5015 (Spies Hecker GmbH, Cologne):
  Mixture of polyurethane resins, pigments and/or fillers, and organic solvents (about 35% by weight).
Percotex LA-Haft-/Grund 040 RAL 6013 and RAL 7035 (Spies Hecker):
  Mixture of OH-functional acrylic resins, pigments and/or fillers, such as talc, heavy spar, zinc oxide and other functional pigments, and organic solvents (about 40% by weight).
Helacryl-Klarlack für Leichtmetalle (Spies Hecker):
  Mixture of OH-functional acrylic resins and organic solvents (about 50% by weight).
A water-based adhesion promoter was used for comparison
  Baydur PU-Haftvermittler (Rhein Chemie Rheinau, GmbH, Mannheim):
  Aqueous polyurethane dispersion without added fillers, about 40% by weight polyurethane content.

The curing agent used comprised Percotex-Härter 3840 (Spies Hecker), silicone-free curing agent comprising about 25% by weight of organic solvent and about 75% by weight of aliphatic isocyanate (e.g. hexamethylene diisocyanate). The curing agent was mixed with the adhesion promoter in a ratio of 10:1 (1 part by weight of curing agent to 10 parts by weight of adhesion promoter).

The polyurethane elastomer applied comprised one of the following two-component polyurethane foam systems (Ernst Sonderhoff GmbH, Cologne). In each case, the two components A and B were mixed in metering equipment directly on application:

| Component A: | Component B | Mixing ratio |
| --- | --- | --- |
| Fermapor K31-9124 | K31-B5 | 3.5:1 |
| Fermapor K31-9299-1 | K31-B-RF | 6:1 |
| Fermapor K31-9260-2 | K31-B (normal) | 6:1 |

Make up of the A components:

| | |
| --- | --- |
| Bi- and higher-functional polyether polyols | 50–95% by weight |
| Color pigments | 0–20% by weight |
| Thickeners or agents with thixotropic effect | 0.1–6% by weight |
| Water | 0.1–6% by weight |
| Bi- or higher-functional short-chain glycols | 0.1–10% by weight |
| Secondary and tertiary amine catalysts | 0.1–2% by weight |
| Tin catalysts | 0.01–0.5% by weight |
| Fillers, functionalized or non-functionalized | 0–50% by weight |
| Other functional additives | 0–30% by weight |

Make up of the B components:

| | |
| --- | --- |
| Diphenylmethane diisocyanate (MDI), monomer | 10–95% by weight |
| Polymeric MDI | 0–50% by weight |
| MDI derivatives (prepolymers, etc.) | 0–80% by weight |

EXAMPLE 1

Sample plaques were injection molded from commercially available polyoxymethylene copolymer (Hostaform ® grades from Ticona GmbH, Kelsterbach). Using metering equipment (Ernst Sonderhoff GmbH, Cologne), the adhesion promoter comprising solvents was applied to the cooled molding without any further pretreatment. Once this coating had dried completely, i.e. after the solvent had evaporated, metering equipment was again used to apply the polyurethane elastomer in the form of a bead. The adhesion in the resultant composite articles was assessed after about 24 hours. For this, the polyurethane bead was pulled away by hand, and the fracture behavior of the bead was assessed subjectively using the following criteria:

| | |
| --- | --- |
| ++ | Cohesive fracture |
| + | Predominantly cohesive fracture |
| o | from about 30 to 50% of the contact surface cohesive fracture |
| − | Adhesive fracture, moderate pull-off force required |
| −− | Adhesive fracture, low pull-off force required |

For comparison, the sample plaques were given no surface treatment, but cleaned with ethanol and subjected to corona- or flame-treatment, or had a water-based adhesion promoter applied. The polyurethane bead was applied and the fracture behavior assessed as described above. Tables 1a and 1b give the results of bond-strength studies for a variety of PU foam systems.

TABLE 1a

Bond strength of 2-c PU foam on polyoxymethylene

| | PU foam system | | | | | |
|---|---|---|---|---|---|---|
| | Fermapor K31-9124/K31-B5 | | | | Fermapor K31-9299/K31-B-RF | |
| Thermoplastic | Hostaform 9021 | Hostaform 9021 GF 20 | Hostaform S9063 | Hostaform S9064 | Hostaform 9021 | Hostaform 9021 GF 20 |
| Untreated | -- | -- | -- | -- | -- | - |
| Cleaned with ethanol | -- | -- | -- | -- | -- | - |
| Corona-treated | -- | - | -- | -- | -- | - |
| Flame-treated | - | - | + | + | - | - |
| Percotex 449 | - | + | + | - | ○ | + |
| Percotex 6013 without curing agent | ○ | ++ | ++ | ++ | ○ | ++ |
| Percotex 6013 with curing agent | ○ | ++ | ++ | ++ | ○ | ++ |
| Percotex 7035 without curing agent | ○ | ++ | + | + | ○ | + |
| Percotex 7035 with curing agent | ○ | ++ | + | + | ○ | ++ |
| Helacryl without curing agent | ○ | + | ○ | - | ○ | + |
| Helacryl with curing agent | - | + | ○ | ○ | ○ | ++ |
| Baydur | -- | - | -- | - | - | -- |

TABLE 1b

Bond strength of 2-c PU foam on polyoxymethylene

| | PU foam system Fermapor K31-9299/K31-B-RF | |
|---|---|---|
| Thermoplastic | Hostaform 9021 | Hostaform 9021 GF 20 |
| Untreated | -- | - |
| Cleaned with ethanol | -- | - |
| Corona-treated | -- | - |
| Flame-treated | - | - |
| Percotex 449 | ○ | + |
| Percotex 6013 without curing agent | ○ | ++ |
| Percotex 6013 with curing agent | ○ | ++ |
| Percotex 7035 without curing agent | ○ | + |
| Percotex 7035 with curing agent | ○ | ++ |
| Helacryl without curing agent | ○ | + |
| Helacryl with curing agent | ○ | ++ |
| Baydur | - | -- |

The experiments confirm that the use of adhesion-promoter systems comprising solvents can markedly improve the adhesion of PU foam on polyacetal. It is in principle unimportant here whether the adhesion promoter is used with or without addition of a curing agent. Particularly good bond strengths are also achieved if the polyacetal comprises glass fibers (GF 20=20% by weight of glass fiber) or dispersed thermoplastic polyurethanes (TPUs) (S9063 and S9064). The use of a curing agent with the adhesion promoter has to depend on the particular combination of polyacetal and PU foam.

EXAMPLE 2

Sample plaques were produced as described in Example 1 from commercially available polybutylene terephthalate (Celanex®, Ticona GmbH) with 20 and, respectively, 30% by weight glass fiber content, and these were treated with adhesion promoter comprising solvents. For comparison, the sample plaques were given no surface treatment but cleaned with ethanol and subjected to corona- or flame-treatment, or had a water-based adhesion promoter applied. The polyurethane bead was applied and the fracture behavior assessed as described above. Table 2 gives the results of the bond-strength studies.

TABLE 2

Bond strength of 2-c PU foams on polyester

| | PU foam system | | | |
|---|---|---|---|---|
| | Fermapor K31-9124/ K31-B5 | | Fermapor K31-9299-1/ K31-B-RF | |
| Thermoplastic | Celanex GF20 | Celanex GF30 | Celanex GF20 | Celanex GF30 |
| Untreated | -- | -- | - | - |
| Cleaned with ethanol | -- | - | - | - |
| Corona-treated | -- | ○ | - | - |
| Flame-treated | - | ○ | - | - |
| Percotex 449 | ○ | + | ○ | + |
| Percotex 6013 without curing agent | + | ++ | + | + |
| Percotex 6013 with curing agent | + | ++ | + | + |
| Percotex 7035 without curing agent | ○ | + | ○ | + |
| Percotex 7035 with curing agent | ○ | + | + | + |
| Helacryl without curing agent | - | + | ○ | - |
| Helacryl with curing agent | - | ○ | + | - |
| Baydur | - | - | - | - |

EXAMPLE 3

Sample plaques were produced as described in Example 1 from commercially available polyphenylene sulfide (Fortron®, Ticona GmbH) and commercially available LC polymer (Vectra® liquid-crystalline polyester, Ticona GmbH), and treated with adhesion promoter. The polyurethane bead was applied and the fracture behavior was assessed as described above. Table 3 gives the results of the bond-strength studies.

TABLE 3

Bond strength of 2-c PU foam on polyphenylene sulfide and LC polymer

| | PU foam system Fermapor K31-9299-1/K31-B-RF | | | |
|---|---|---|---|---|
| Thermoplastic | Fortron 1140 L4 | Fortron 6165 A4 | Vectra E130 | Vectra E130i |
| Percotex 6013 without curing agent | ++ | ++ | ++ | ++ |
| Percotex 6013 with curing agent | ++ | ++ | ++ | ++ |
| Percotex 7035 without curing agent | ++ | ++ | ++ | ++ |
| Percotex 7035 with curing agent | ++ | ++ | ++ | ++ |

TABLE 4

Bond strength of 2-c PU foam on polyamide and polypropylene

| | PU foam system Fermapor K31-9260/K31-B (normal) | |
|---|---|---|
| Thermoplastic | Nylon-6,6 | PP GF 40% |
| Untreated | − | −− |
| Flame-treated | ○ | ++ |
| Percotex 449 | + | −− |
| Percotex 6013 without curing agent | ++ | −− |
| Percotex 6013 with curing agent | ++ | −− |
| Percotex 7035 without curing agent | ++ | −− |
| Percotex 7035 with curing agent | ++ | −− |
| Helacryl without curing agent | + | −− |
| Helacryl with curing agent | + | −− |
| Baydur | − | −− |

Example 4

Sample plaques are produced as described in Example 1 from commercially available nylon-6,6 and commercially available polypropylene (PP) with a glass fiber content of 40% by weight (comparative example), and treated with adhesion promoter. For comparison, the sample plaques were not surface treated or flame-treated, or, respectively, given an application of water-based adhesion promoter. The polyurethane bead was applied and the fracture behavior assessed as described above. Table 4 gives the results of the bond-strength studies.

With polyamide there is again a marked improvement in the bond strength of the PU foam as a result of using an adhesion promoter comprising solvents (with or without addition of a curing agent), but on the nonpolar polypropylene, even with a high content of glass fiber, no improvement in bond strength can be detected.

Overall, the experiments show that the use of a water-based adhesion promoter (Baydur) cannot improve the bond strength.

Example of application in a door closure housing with a sealing lip: a door closure housing for a motor vehicle door was injection molded from Hostaform. The periphery of the housing had a smooth rim, intended to give a damped seal between the motor vehicle door and the door closure when installed. Using a first piece of metering equipment, Percotex LA Haft/Grund 040 (RAL 7035) was applied as adhesion-promoter system to this rim. Before the solvent had dried off completely, a second piece of metering equipment was used to apply the Fermapor K31-9124/K 31-B5 2-component polyurethane foam system in a ratio of 3.5/1 in the form of a bead around the pretreated rim.

What is claimed is:

1. A process for producing a composite article from at least one polar thermoplastic and at least one polyurethane elastomer, where a molding is first molded from the polar thermoplastic, and some or all of this is provided with an adhesion promoter based on polyurethane resins comprising at least one organic solvent, and then a coating which may be full-surface or strip form, or at least one other molding made from the polyurethane elastomer is used for overmolding, and the thermoplastic is thus bonded to the polyurethane elastomer via the adhesion promoter.

2. The process as claimed in claim 1, wherein the application of the polyurethane elastomner to the thermoplastic material provided with the adhesion promoter precedes the urethane-crosslinking and/or the physical drying of the adhesion promoter.

3. The process as claimed in of claim 1, wherein the polyurethane elastomer is applied in the form of a sealing lip, by a process which lays down strips of material and the polar thermoplastic used comprises an engineering thermoplastic which is a polyacetal, polyester, polyarylene sulfide, polycarbonate, polyphthalamide, polyetherimide, polyether ether ketone, syndiotactic polystyrene, cycloolefin copolymer, liquid-crystalline polymer or mixtures or blends of these with one or more other plastics.

4. The process as claimed in claim 1, wherein the thermoplastic used comprises polyoxymethylene homopolymer, polyoxymethylene copolymer, polybutylene terephthalate, polyethylene terephthalate, liquid-crystalline polymers or polyphenylene sulfide.

5. A process for producing a composite article from at least one polar thermoplastic and at least one polyurethane elastomer, where a molding is first molded from the polar thermoplastic, and some or all of this is provided with an adhesion promoter based on polyurethane resins or acrylic resins comprising at least one organic solvent, and then a coating which may be full-surface or strip form, or at least one other molding made from the polyurethane elastomer is used for overmolding, and the thermoplastic is thus bonded to the polyurethane elastomer via the adhesion promoter and the thermoplastic is a polyacetal, polyarylene sulfide, polyether ether ketone, syndiotactic polystyrene, cycloolefin copolymer, liquid-crystalline polymer or mixtures thereof.

6. The process as claimed in claim 5, wherein the application of the polyurethane elastomer to the thermoplastic material provided with the adhesion promoter precedes the urethane-crosslinking and/or the physical drying of the adhesion promoter.

7. The process as claimed in of claim 5, wherein the polyurethane elastomer is applied in the form of a sealing lip, by a process which lays down strips of material.

\* \* \* \* \*

UNITED STATES PATENT AND TRADEMARK OFFICE
CERTIFICATE OF CORRECTION

PATENT NO. : 6,497,782 B1
DATED : December 24, 2002
INVENTOR(S) : Platz et al.

It is certified that error appears in the above-identified patent and that said Letters Patent is hereby corrected as shown below:

Column 12,
Line 21, delete "elastomner" and insert -- elastomer --.
Line 37, delete "polymers" and insert -- polymer --.

Signed and Sealed this

Twentieth Day of May, 2003

JAMES E. ROGAN
*Director of the United States Patent and Trademark Office*